US011334958B2

(12) United States Patent
Hodge et al.

(10) Patent No.: US 11,334,958 B2
(45) Date of Patent: May 17, 2022

(54) SYSTEM AND METHOD FOR VISITATION MANAGEMENT IN A CONTROLLED ENVIRONMENT

(71) Applicant: **Global Tel*Link Corporation**, Reston, VA (US)

(72) Inventors: Stephen Lee Hodge, Aubrey, TX (US); Anthony Bambocci, Altoona, PA (US)

(73) Assignee: **Global Tel*Link Corporation**, Reston, VA (US)

( * ) Notice: Subject to any disclaimer, the term of this patent is extended or adjusted under 35 U.S.C. 154(b) by 0 days.

(21) Appl. No.: 17/107,323

(22) Filed: Nov. 30, 2020

(65) Prior Publication Data

US 2021/0142434 A1 May 13, 2021

Related U.S. Application Data

(63) Continuation of application No. 16/417,187, filed on May 20, 2019, now Pat. No. 10,853,901, which is a (Continued)

(51) Int. Cl.
*G06Q 50/26* (2012.01)
*G07C 9/25* (2020.01)
*G06Q 10/10* (2012.01)

(52) U.S. Cl.
CPC ......... *G06Q 50/26* (2013.01); *G06Q 10/1095* (2013.01); *G07C 9/257* (2020.01)

(58) Field of Classification Search
CPC ........... G06Q 10/00–50/00; G07C 1/00–15/00 (Continued)

(56) References Cited

U.S. PATENT DOCUMENTS

| 4,360,827 A | 10/1982 | Braun |
| 4,965,819 A | 10/1990 | Kannes |

(Continued)

FOREIGN PATENT DOCUMENTS

CA 2845843 A1 9/2014

OTHER PUBLICATIONS

Bowyer et al., "A survey of approaches and challenges in 3D and multi-modal 3D+2D face recognition," Computer Vision and Image Understanding, vol. 101, No. 1, 2006; pp. 1-15.
(Continued)

*Primary Examiner* — Alan S Miller
(74) *Attorney, Agent, or Firm* — Sterne, Kessler, Goldstein & Fox P.L.L.C.

(57) ABSTRACT

A system is described herein that facilitates the easy scheduling and conducting of prison visitations. The system provides a remotely-accessible means for visitors to authenticate themselves, check the availability of those they wish to visit, and schedule a visit with that individual. As part of this process, the system tracks the availability of prison inmates as well as the devices and visit sites that are available to those inmates. In this manner, the system can quickly identify the availability of different inmates in order to provide on-demand scheduling capabilities to potential visitors. The system is connected to multiple facilities as well as public networks, and therefore can be remotely accessed. Additionally, the system also functions to monitor visits while they are in progress, as well as to store visit recordings for future review. Because the system is networked, remote monitors can access the review system in order to monitor visits or review recordings. The system also employs rigorous authentication and other security measures to ensure the safety and security of the visitors, the inmates, the staff, as well as others within the prison facility.

18 Claims, 8 Drawing Sheets

Related U.S. Application Data continuation of application No. 15/041,842, filed on Feb. 11, 2016, now Pat. No. 10,296,994.

(58) Field of Classification Search
USPC .............................................. 705/7.11–7.42
See application file for complete search history.

(56) References Cited

U.S. PATENT DOCUMENTS

| | | | |
|---|---|---|---|
| 4,994,908 A | 2/1991 | Kuban et al. | |
| 5,539,812 A * | 7/1996 | Kitchin | H04M 1/53 379/189 |
| 5,541,639 A | 7/1996 | Takatsuki et al. | |
| 5,553,609 A | 9/1996 | Chen et al. | |
| 5,559,875 A | 9/1996 | Bieselin et al. | |
| 5,589,873 A | 12/1996 | Natori et al. | |
| 5,589,878 A | 12/1996 | Cortjens et al. | |
| 5,642,156 A | 6/1997 | Saiki | |
| 5,719,928 A | 2/1998 | Pinnell et al. | |
| 5,781,731 A | 7/1998 | Koreeda et al. | |
| 5,841,469 A | 11/1998 | Freeman et al. | |
| 5,848,132 A | 12/1998 | Morley et al. | |
| 5,852,466 A | 12/1998 | Komine et al. | |
| 5,961,446 A | 10/1999 | Beller et al. | |
| 5,978,363 A | 11/1999 | Dimitrijevic et al. | |
| 5,999,208 A | 12/1999 | McNerney et al. | |
| 6,009,169 A | 12/1999 | Styron | |
| 6,163,798 A | 12/2000 | Frank | |
| 6,181,789 B1 | 1/2001 | Siegmund et al. | |
| 6,192,118 B1 | 2/2001 | Bayless et al. | |
| 6,195,117 B1 | 2/2001 | Miyazaki | |
| 6,205,716 B1 | 3/2001 | Peltz | |
| 6,219,640 B1 | 4/2001 | Basu et al. | |
| 6,275,251 B1 | 8/2001 | Hartman et al. | |
| 6,611,583 B1 * | 8/2003 | Gainsboro | H04M 3/2281 379/188 |
| 6,734,900 B2 | 5/2004 | Mayhew | |
| 6,879,828 B2 | 4/2005 | Virtanen et al. | |
| 7,027,659 B1 | 4/2006 | Thomas | |
| 7,046,779 B2 | 5/2006 | Hesse | |
| 7,061,521 B2 | 6/2006 | Bulriss et al. | |
| 7,085,359 B2 * | 8/2006 | Crites | G06F 21/55 379/112.01 |
| 7,106,843 B1 | 9/2006 | Gainsboro et al. | |
| 7,256,816 B2 | 8/2007 | Profanchik et al. | |
| 7,436,988 B2 | 10/2008 | Zhang et al. | |
| 7,519,169 B1 * | 4/2009 | Hingoranee | H04M 3/42068 379/114.13 |
| 7,899,167 B1 | 3/2011 | Rae | |
| 7,908,622 B1 * | 3/2011 | Blevins | H04N 7/17318 725/78 |
| 7,911,513 B2 | 3/2011 | Garrison et al. | |
| 8,218,829 B2 | 7/2012 | Kenoyer | |
| 8,370,206 B2 * | 2/2013 | Collins | G06Q 30/0601 705/26.1 |
| 8,489,887 B1 | 7/2013 | Newman et al. | |
| 8,620,711 B2 * | 12/2013 | Tor | G06Q 50/188 705/7.19 |
| 8,917,848 B2 | 12/2014 | Torgersrud et al. | |
| 8,929,525 B1 * | 1/2015 | Edwards | H04N 7/147 379/114.21 |
| 9,007,420 B1 * | 4/2015 | Passe | H04N 7/147 348/14.01 |
| 9,007,425 B1 | 4/2015 | Simon | |
| 9,058,474 B2 * | 6/2015 | Alvord | H04W 4/021 |
| 9,064,257 B2 | 6/2015 | Beigi | |
| 9,065,971 B2 | 6/2015 | Verthein et al. | |
| 9,083,850 B1 | 7/2015 | Higgs | |
| 9,094,569 B1 | 7/2015 | Humphries | |
| 9,106,789 B1 | 8/2015 | Shipman et al. | |
| 9,232,051 B2 * | 1/2016 | Torgersrud | H04M 3/2281 |
| 9,300,790 B2 | 3/2016 | Gainsboro et al. | |
| 9,420,094 B1 | 8/2016 | Keiser et al. | |
| 9,558,523 B1 | 1/2017 | Hodge | |
| 9,584,652 B2 * | 2/2017 | Fischer | H04W 4/06 |
| 9,615,060 B1 | 4/2017 | Hodge | |
| 9,661,272 B1 | 5/2017 | Daniel | |
| 9,674,340 B1 * | 6/2017 | Hodge | H04M 3/2281 |
| 9,681,097 B1 | 6/2017 | Hodge et al. | |
| 9,774,826 B1 | 9/2017 | Hodge | |
| 10,225,518 B2 | 3/2019 | Hodge | |
| 10,275,811 B2 * | 4/2019 | Collins | G06Q 10/00 |
| 10,296,994 B2 * | 5/2019 | Hodge | G06Q 10/1095 |
| 10,321,094 B2 | 6/2019 | Hodge et al. | |
| 10,853,901 B2 * | 12/2020 | Hodge | G06Q 50/26 |
| 2003/0174826 A1 * | 9/2003 | Hesse | H04M 3/567 379/210.01 |
| 2004/0029564 A1 * | 2/2004 | Hodge | H04M 3/42221 455/411 |
| 2004/0172652 A1 * | 9/2004 | Fisk | H04L 29/06 725/78 |
| 2004/0257473 A1 * | 12/2004 | Miyagawa | H04N 7/144 348/571 |
| 2005/0043014 A1 * | 2/2005 | Hodge | G06F 16/24575 455/411 |
| 2005/0114192 A1 * | 5/2005 | Tor | G06Q 10/109 705/80 |
| 2006/0087555 A1 * | 4/2006 | Boyd | H04N 7/15 348/14.09 |
| 2006/0259755 A1 | 11/2006 | Kenoyer | |
| 2006/0285650 A1 * | 12/2006 | Hodge | H04M 3/42221 379/32.01 |
| 2006/0285667 A1 * | 12/2006 | Hodge | H04M 1/72457 379/142.05 |
| 2007/0003026 A1 * | 1/2007 | Hodge | H04M 17/00 379/88.1 |
| 2007/0071206 A1 | 3/2007 | Gainsboro et al. | |
| 2008/0000966 A1 * | 1/2008 | Keiser | G06Q 10/10 235/382 |
| 2008/0065680 A1 * | 3/2008 | Moon | G06F 16/211 |
| 2008/0118045 A1 * | 5/2008 | Polozola | H04M 11/007 379/167.14 |
| 2008/0201158 A1 * | 8/2008 | Johnson | H04M 3/2281 705/1.1 |
| 2008/0320477 A1 * | 12/2008 | Meeks | G06F 11/3495 718/102 |
| 2009/0181716 A1 | 7/2009 | Benco et al. | |
| 2011/0096138 A1 | 4/2011 | Grimshaw | |
| 2011/0194488 A1 | 8/2011 | Kuo et al. | |
| 2011/0249073 A1 | 10/2011 | Cranfill et al. | |
| 2012/0262271 A1 | 10/2012 | Torgersrud et al. | |
| 2012/0281058 A1 * | 11/2012 | Laney | H04N 7/15 348/14.03 |
| 2013/0036369 A1 * | 2/2013 | Mitchell | G06Q 50/00 715/753 |
| 2013/0179949 A1 | 7/2013 | Shapiro | |
| 2013/0194377 A1 * | 8/2013 | Humphries | H04L 65/1076 348/14.08 |
| 2013/0332509 A1 * | 12/2013 | Schwartz | G07C 11/00 709/203 |
| 2014/0018059 A1 * | 1/2014 | Noonan | H04W 16/32 455/419 |
| 2014/0218466 A1 | 8/2014 | Bloms et al. | |
| 2014/0267547 A1 | 9/2014 | Torgersrud et al. | |
| 2014/0273929 A1 | 9/2014 | Torgersrud | |
| 2014/0282898 A1 | 9/2014 | Torgersrud | |
| 2014/0313275 A1 | 10/2014 | Gupta et al. | |
| 2015/0097919 A1 | 4/2015 | Karimi-Cherkandi et al. | |
| 2015/0189227 A1 | 7/2015 | Du et al. | |
| 2015/0294382 A1 * | 10/2015 | Alsina | G06Q 20/40145 705/26.35 |
| 2015/0334562 A1 * | 11/2015 | Perold | H04L 9/088 713/171 |
| 2016/0119580 A1 | 4/2016 | Torgersrud | |
| 2016/0239932 A1 | 8/2016 | Sidler et al. | |
| 2017/0104958 A1 | 4/2017 | Farrell et al. | |
| 2017/0236228 A1 * | 8/2017 | Hodge | G07C 9/257 705/7.19 |
| 2017/0280100 A1 | 9/2017 | Hodge | |

(56) References Cited

U.S. PATENT DOCUMENTS

2017/0289498 A1    10/2017    Hodge et al.
2018/0077387 A1    3/2018    Hodge
2019/0272610 A1*    9/2019    Hodge .................. G07C 9/257

OTHER PUBLICATIONS

Cartoux et al., "Face Authentication or Recognition by Profile Extraction from Range Images," IEEE Proceedings of the Workshop on Interpretation of 3D Scenes, Nov. 1989; pp. 194-199.
Copyright Registration Record for "iPhone: The Missing Manual," 6th ed., 2012; 1 page.
DSKeye Gigabit Product Brief, Bitec Ltd. 2007; 2 pages.
Excerpts from "iPhone: The Missing Manual," 6th ed., Sebastopol, CA: O'Reilly Media, 2012; 61 pages.
Felsberg, "Robot Vision Systems, PhD course spring term 2015," Computer Vision Laboratory PowerPoint Presentation, 2015; 23 pages.
Gotsopoulos et al., "Remote Controlled DSP Based Image Capturing and Processing System Featuring Two-Axis Motion," Proceedings of the 4th European DSP in Education and Research Conference, Dec. 1-2, 2010; pp. 32-36.
Hjelmas et al., "Face Detection: A Survey," Computer Vision and Image Understanding, vol. 83, No. 3, Sep. 2001; pp. 236-274.
Huang et al., "Face Detection and Smile Detection," Proceedings of IPPR Conference on Computer Vision, Graphics, and Image Processing, Shitou, Taiwan, A5-6, 2009; 8 pages.
International Search Report and Written Opinion directed to International Patent Application No. PCT/US2017/014746, dated Mar. 21, 2017; 14 pages.
International Search Report and Written Opinion directed to International Patent Application No. PCT/US2017/017465, dated May 4, 2017; 14 pages.
International Search Report and Written Opinion directed to International Patent Application No. PCT/US17/14129, dated Feb. 17, 2017; 10 pages.
Kirby et al., "Application of the Karhunen-Loeve Procedure for the Characterization of Human Faces,", IEEE Transactions on Pattern Analysis and Machine Intelligence, vol. 12, No. 1, Jan. 1990; pp. 103-108.
Lopez, "Local Binary Patterns Applied to Face Detection and Face Recognition," Final Research Project, Universitat Politecnica de Catalunya, Nov. 2010; 146 pages.
Mazda et al., The Focal Illustrated Dictionary of Telecommunications, 1999; p. 555.
Prosecution History of U.S. Pat. No. 8,929,525, U.S. Appl. No. 14/323,582, filed Jul. 3, 2014.
Toderici et al., "Bidirectional relighting for 3D-aided 2D Face Recognition," Proceedings from IEEE Computer Vision and Pattern Recognition, Jun. 13-18, 2010, San Francisco, CA; pp. 258-274.
Turk et al., "Eigenfaces for Recognition," Journal of Cognitive Neuroscience, vol. 3, No. 1, 1991; pp. 71-86.
U.S. Appl. No. 61/801,861, filed Mar. 15, 2013; 77 pages.
Viola et al., "Rapid Object Detection Using a Boosted Cascade of Simple Features," Computer Vision and Pattern Recognition, 2001; pp. I-511-I-518.
Yang et al., "Detecting Faces in Images: A Survey," IEEE Transactions on Pattern Analysis and Machine Intelligence, vol. 24, No. 1, Jan. 2002; pp. 34-58.
Zhang et al., "A Survey of Recent Advances in Face Detection," Microsoft Research Technical Report No. MSR-TR-2010-66, Microsoft Corporation, 2010.
International Preliminary Report on Patentability, directed to related International Patent Application No. PCT/US2017/014129, dated Jul. 24, 2018; 6 pages.
International Preliminary Report on Patentability, directed to related International Patent Application No. PCT/US2017/017465, dated Aug. 14, 2018; 8 pages.
International Preliminary Report on Patentability, directed to related International Patent Application No. PCT/US2017/014746, dated Sep. 25, 2018; 7 pages.

* cited by examiner

SYSTEM AND METHOD FOR VISITATION MANAGEMENT IN A CONTROLLED ENVIRONMENT

CROSS-REFERENCE TO RELATED APPLICATIONS

This application is a continuation of U.S. patent application Ser. No. 16/417,187, filed May 20, 2019, which is a continuation of U.S. patent application Ser. No. 15/041,842, filed on Feb. 11, 2016, now U.S. Pat. No. 10,296,994, issued May 21, 2019, which are incorporated by reference herein in their entireties.

BACKGROUND

Field

The disclosure relates to a coordinated communication system that schedules, facilitates, and monitors a variety of different inmate communications.

Background

Prison facilities and other controlled environments have historically provided very limited communication options to residents. However, in order to better facilitate inmate rehabilitation, today's controlled facilities seek to offer a wide variety of communication services to inmates. Such services may include traditional telephone calls, email, video visitation, video calling, SMS text messaging, among others. In addition to enhancing the communication options available to inmates, controlled facilities are also seeking to provide greater flexibility regarding when and where inmates are permitted to carry out such communications.

BRIEF DESCRIPTION OF THE DRAWINGS/FIGURES

Embodiments are described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

Figure 1:
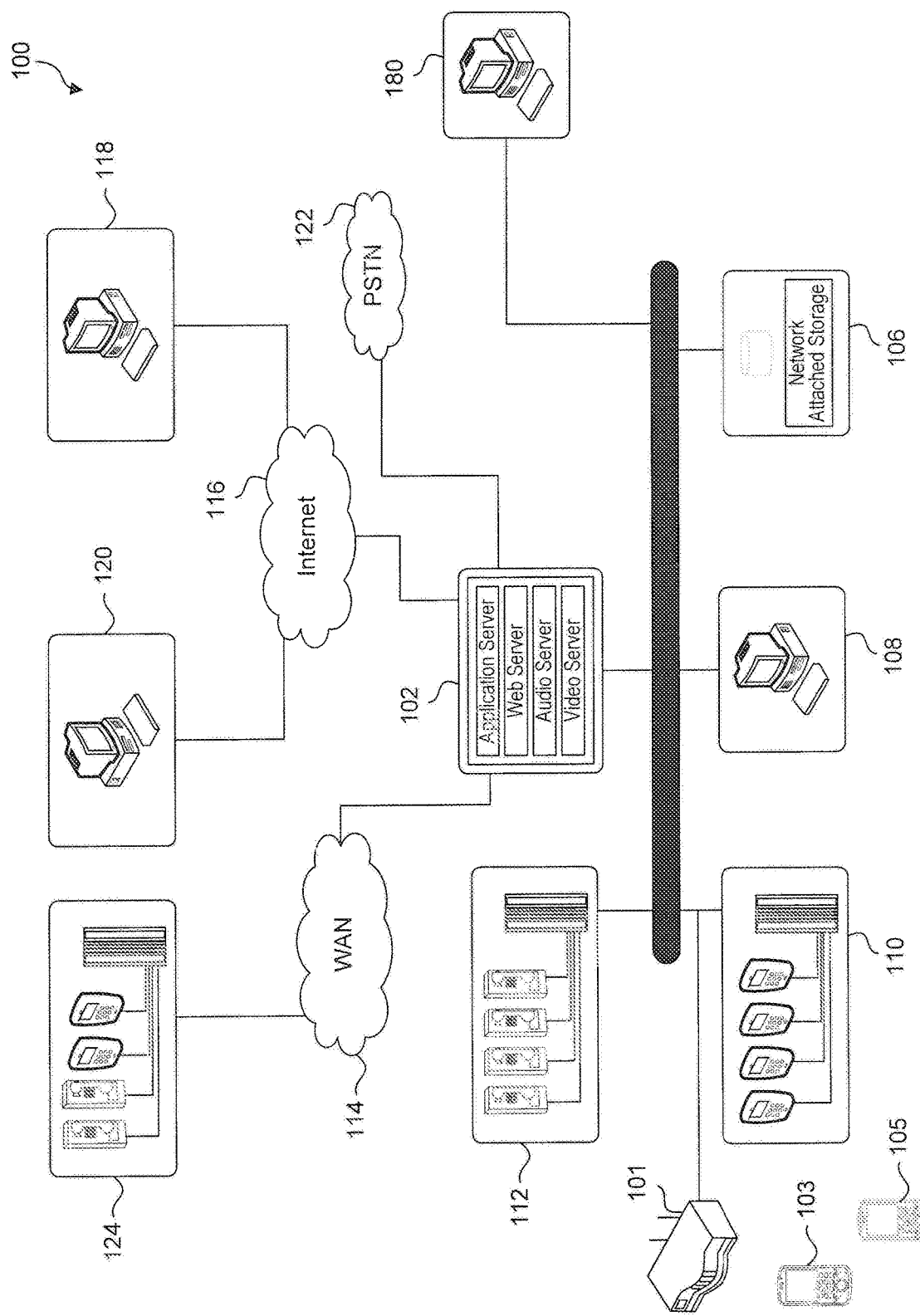
FIG. 1 illustrates a block diagram of an exemplary visitation control system.

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the invention. Rather, the scope of the invention is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer, as described below.

For purposes of this discussion, any reference to the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Overview

Numerous studies have shown that visitation between inmates and outsiders is an extremely important part of rehabilitation. Allowing for an inmate to keep in contact is friends and family significantly helps to reduce recidivism as well as to prepare an inmate for life after prison. Because most inmates are eventually released back into the public, any steps to minimize problems with their re-assimilation with society are highly beneficial.

Typical visitation procedures in controlled environments are designed to balance the inmate's ability to communicate with the security risks associated therewith. For example, each individual inmate is typically prohibited from contacting certain persons, such as former victims, judges, jury men/women, etc. For this reason, as well as to reduce the workload of the institution staff tasked with researching and approving each visitor, a whitelist or blacklist is usually associated with the inmate. A blacklist identifies individuals that the inmate is prohibited from calling, whereas the whitelist identifies individuals the inmate is permitted to call. When the system employs a blacklist, the inmate is permitted to contact anybody not listed. Conversely, when using a whitelist, the inmate is permitted to call only the individuals on the list.

Visitations between inmates and members of the general public can generally occur using any of several different methods. A common, but risky, example is a face-to-face visit. In this type of visit, the inmate and visitors are usually located in a common area overseen by Corrections Officers. Direct contact is not necessarily prohibited, but is usually closely monitored and limited. Such direct face-to-face visitation is the most difficult to monitor and control because it occurs outside of the purviews of the communication system. Additionally, this type of visit requires physical screening of the visitor to ensure that they do not bring in any contraband. Another disadvantage of this type of visit is the facility's ability to enforce rules.

Because of the heavy risks associated with face-to-face contact, a common modification to this type of visitation has been to place a physical barrier between the individuals, such as a Plexiglas window. This addresses a number of the problems associated with face-to-face visitation. For example, the individuals will usually communicate through the glass via telephone handsets. Because the communications are electronic, they can be monitored by the visitation system. Additionally, there is a significant reduction in the likelihood of the outside visitor exchanging contraband with the inmate. However, there is still a problem with allowing outsiders into the prison facility.

Additionally, it is not always easy for outside family members to physically travel to the prison location. Therefore, another form of visitation is facility-based video visitation. In this form, both the inmate and the visitor are at different locations within the prison facility, but are electronically connected via a video conferencing device/system. The individuals communicate with each other using telephone handsets or other similar devices with a speaker and microphone. Further, in order to facilitate the video aspect of the communication, each user is equipped with a camera for capturing video information and a display for displaying the video information transmitted from the other user.

Similar to facility-based video visitation is remote video visitation. As its name implies, this form of visitation is similar to facility-based video visitation, except that while the inmate remains in the facility, the outside party is at a remote location. The video communication is then performed over the internet, for example. In this form of visitation, the inmate need not necessarily be restricted to a particular location for the video communication, but can use a PID (personal inmate device).

For each of these different visitation types, there is a certain amount of planning and recordkeeping required. In some facilities, software, such as a Jail Management System (JMS), automates part of the recordkeeping, storing inmate information along with visitor information in the computer system. In more sophisticated JMS installations, the software can also perform basic enemy checking, employee checking, and past felony checking on visitors with the data already stored in the JMS database.

In light of the above, the present disclosure provides a system and method of facilitating different types of visitations in a controlled-access environment. This consists of a system that provides scheduling services to coordinate actual visits, provides the exchange of the electronic communications between the parties, performs monitoring of the audio and/or video for rules violations or other security risks, etc. By providing a coordinated system for managing the different forms of visitation, significant burden can be removed from prison staff, while simultaneously enhancing the prisoner's communication options.

Visitation System

FIG. 1 illustrates a block diagram of an exemplary visitation control system 100. The visitation control system 100 includes a visitation control unit 102 configured to communicate with a variety of devices over a variety of different communications networks. For example, the visitation control unit 102 interfaces with a LAN 104 to communicate with several local devices, such as data storage 106, control stations 108, video communications devices 110, audio communication devices 112, and wireless devices 103/105. In an embodiment, the visitation control unit 102 is also connected to a wireless access point (e.g., a router) 101, which may provide connectivity to the wireless devices 103/105.

In an embodiment, the visitation control unit is also connected to any or all of a Wide-Area Network (WAN) 114, the Internet 116, and the Public Switched Telephone Network (PSTN) 122. The WAN 114 may facilitate communications with other nearby prisons, such as those within the same county, state, etc. Audio and/or video devices 124 located at those other facilities may provide cross-facility visitations between inmates. In an embodiment, WebRTC may be utilized in place of an SIP protocol over a WAN or the Internet, each of which provides a dedicated, private link between the visitation control unit and remote devices.

The Internet 116 is utilized to provide access to remotely distributed control stations, scheduling clients 118, and home visitation devices 120. The PSTN can be used to provide connectivity to basic telephones and other communication devices over traditional data networks.

Data Storage

Figure 2:
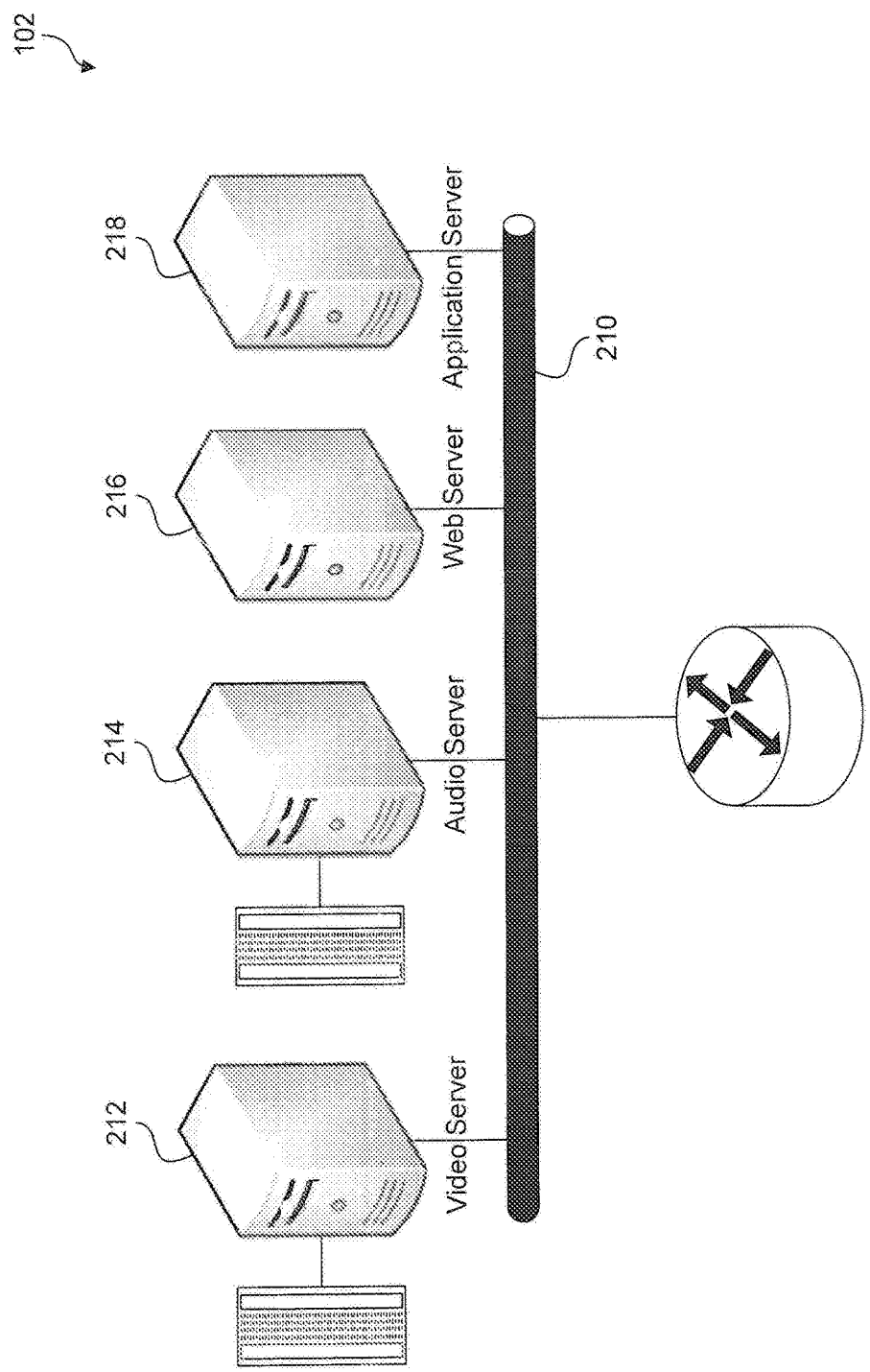
FIG. 2 illustrates a block diagram of an exemplary visitation control unit.

FIG. 2 illustrates a block diagram of an exemplary visitation control unit 200 that may represent an exemplary embodiment of the visitation control unit 102. The visitation control unit 200 includes a video server 212, an audio server 214, a web server 216, and an application server 218, that are all connected to each other via a network bus 210.

Each of the servers 212-218 can be constructed as individual physical hardware devices, or as virtual servers. The number of physical hardware machines can be scaled to match the number of simultaneous user connections desired to be supported in the visitation management system.

The video server 212 can consist of any number of servers, and is connected to each of the video visitation devices. The video server 212 serves many roles necessary to facilitate the secure communication between the visitors. For example, in an embodiment, the video server performs the switching required to electrically connect two or more visitation station units together for a visitation session. In an embodiment, the video server 212 also sends the audio and/or video information to a monitoring station 180 for monitoring the communication. The monitoring station 180 can be located on-site or at a remote monitoring location, and allows corrections officers or others to monitor the visit in real-time, on delay, or in the form of an audio or audio/video recording.

Because there may be a variety of different video communication standards employed by different video visitation devices that wish to participate in video communications, in an embodiment, the video server 212 may also perform real-time format conversion. The conversion my convert incoming signals to be compatible with on-site devices, or may convert outgoing signals to be compatible with recipient devices.

The audio server 214 can consist of any number of servers, and connects audio devices to the video visitation system 100. As with the video server 212, the audio server also sends the audio information to a monitoring station for monitoring the communication, in an embodiment. In an embodiment, the audio server 214 is configured to detect three-way calls in the audio stream, such as by the detection of a hook-flash or other indicating event, has the ability to detect and respond to Dual-Tone Multi-Frequency (DTMF) inputs, and any other event that can be generated by a telephone. In an embodiment, the audio server 214 is further capable of ringing the telephone devices and connecting to outside lines via the PSTN to route audio to outside sources, such as land lines and/or cellular phones.

The web server 216 may also consist of any number of servers, and is configured to run Apache, Microsoft Internet Information Server, or other web server software. The primary function of the web server is to route requests and other communications from visitation control stations, remote visitation scheduling clients, and home visitation devices into the appropriate destination within the visitation control unit. In an embodiment, the web server can also serve as a maintenance point into the visitation control unit 200, by which servicing, configuring, and updating can be performed. In an embodiment, the web server 216 is connected to both the public Internet and the internal network of the facility.

Figure 3:
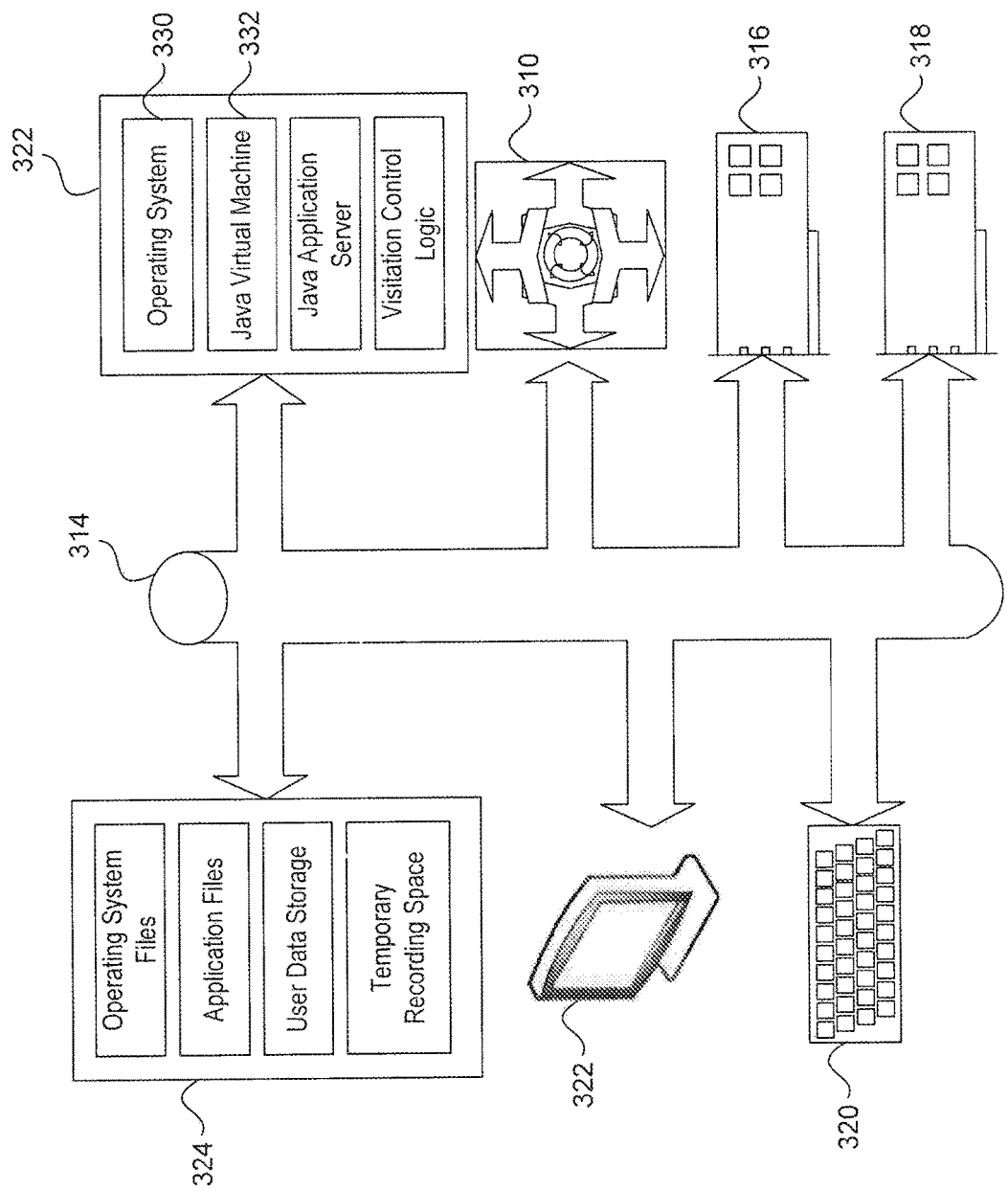
FIG. 3 illustrates a block diagram of an exemplary application server that may be incorporated into the visitation control unit.

FIG. 3 illustrates an exemplary application server 300, which may represent the application server 218 depicted in FIG. 2. The application server 300 functions as the primary logic processing center in the visitation management system 100. The application server 300 includes one or more central processing units (CPU) 310 connected via a bus 314 to several other peripherals. Such peripherals include an input device 320, such as a keyboard and/or mouse, a monitor 322 for displaying information, and a network interface card 316 and/or a modem 318 that provide network connectivity and communication.

The application server 300 also includes internal data storage 324. This data storage 324 is non-volatile storage, preferably in the form of one or more magnetic hard disk drives (HDDs). The data storage 324 is used to store a variety of important files, documents, or other digital information, such as the operating system files, application files, user data, and/or temporary recording space.

The application server 300 also includes system memory 322. The system memory is preferably faster and efficient than the data storage 324, and is configured as random access memory (RAM) in an embodiment. The system memory 322 contains the runtime environment of the application server, storing temporary data for any of the operating system 330, java virtual machine 332, java application server 334, and visitation control logic 336.

Figure 4:
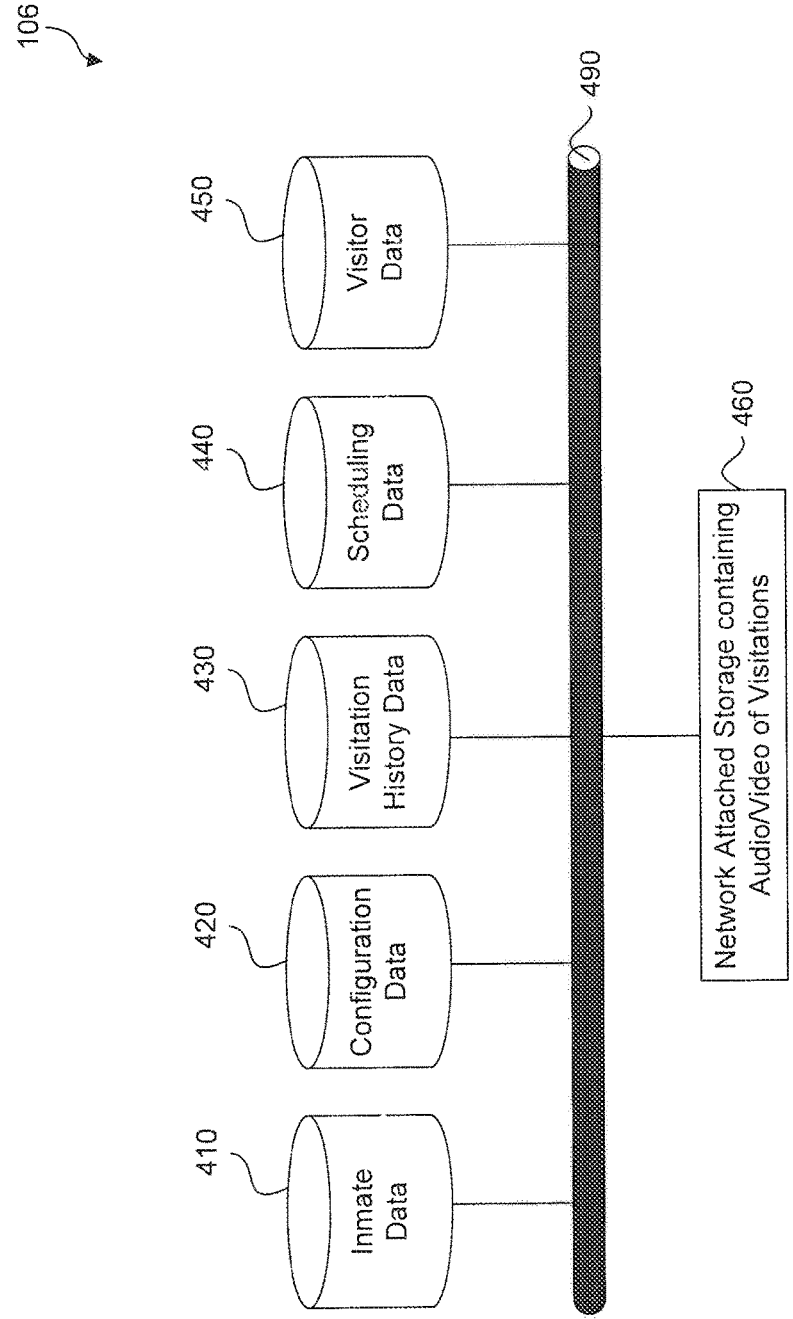
FIG. 4 illustrates a block diagram of exemplary storage devices used by the visitation control system.

FIG. 4 illustrates a block diagram of exemplary storage devices 400 used by the visitation control system 200. As shown in FIG. 4, in addition to the storage on the application server, there may also be one or more databases and associated Network Attached Storage devices connected to the application server 300 via the network. For purposes of this disclosure, the term "database" should be understood to encompass a relational database application or a remotely defined data store in addition to a traditional relational database.

As shown in FIG. 4, the storage devices 400 provide access to a wide variety of data. Inmate data 410 preferably includes information about individual inmates, such as name, address, commitment information, etc. These records may be directly entered, or may be obtained from an Inmate Telephone System or Jail Management System. Configuration data 420 can be stored to provide configuration details for upcoming visits. Such configurations may include the connection details of one or more hardware devices anticipated to be used for the visit, such as the video and audio servers, web servers, application servers, and remote devices. The configuration data 420 allows the system to be configured with a variety of different hardware types and manufacturers, and allow for more error-free visitations.

Visitation history data 430 stores information relating to completed visits. The information included within these records may consist of the inmate involved in the visit, the outside party involved in the visit, the resources used for the visit, including the type of devices used by each of the parties, the date/time of the visit, the visit duration, etc. This information can be populated by the visitation management system 100 by tracking and monitoring visits, and recording the data associated therewith.

Scheduling data 440 stores visitation events that have not yet occurred as well as historical visit information (e.g., visitation session records). In this regard, the scheduling data 440 stores a calendar of scheduled visits, as well as information relating to those scheduled visits, such as the parties to be involved, their contact information, and the visitation devices to be used by those individuals. The visitation schedule records may include links to data relating to any of the involved parties, including inmates, visitors, and correctional staff (if needed). In an embodiment, a separate data store can be used to store the visitation session records. Further, in an embodiment, the visitation session records may include a link to the original visitation session reservation, any recordings or transcripts of the visitation session, and/or a list of the actual resources used, if they differed from the scheduled resources.

Although information regarding the visitors may be directly stored in the respective databases, a visitor database 450 may be provided in an embodiment to separately store visitor information. Visitors may then be identified in various ones of the data stores by name or identifier only. This name/identifier may include a link to full biographical information of the visitor in the visitor data store 450.

In an embodiment, it is also desirable to store actual recordings of the visitation data. There are many reasons to store such information, primarily monitoring. However, because video and audio files consume significant amounts of storage space, this data is preferably stored on a Network Attached Storage (NAS) device 460 configured as a mass storage device. The data stores 410-450 may include links and/or pointers to recording data located on the NAS device 460. In order to reduce the required size of the NAS device 460, the NAS device preferably includes a backup routine to transfer recording data to permanent storage devices, such as archival permanent storage or optical disks, after a predetermined time has elapsed since the initial recording of that data. The NAS device 460 is connected to the data stores by way of a network 490.

System Operation

The system provides visitation between a variety of different devices and individuals. For starters, regardless of the visit type, the devices being used to conduct the visit are coupled to the visitation system 100, even in the instance of face-to-face visits. For example, communication signals from each of the devices are provided to the audio server 214 or the video server 212. In the case of traditional phones, because they are not connected directly to each other, the audio server is configured to provide line power and logical switching services. Further, because of the integrated nature of the system, the phones can be connected to other types of devices in real-time, which advantageously increases the flexibility of the system.

In an embodiment, the system 100 is also configured to facilitate the use of smart devices (wired or wireless). Like in the case of line-wire phones, the wireless devices are also coupled to the audio and/or video servers. Because of the modular use of these types of devices, the system 100 preferably performs authentication techniques in this embodiment so as to ensure that the participants are who they claim to be. The respective servers could also provide interactive feedback to the devices, such as the display of elapsed time on the visit, or time remaining, as well as other informational data about the visit.

Figure 5:
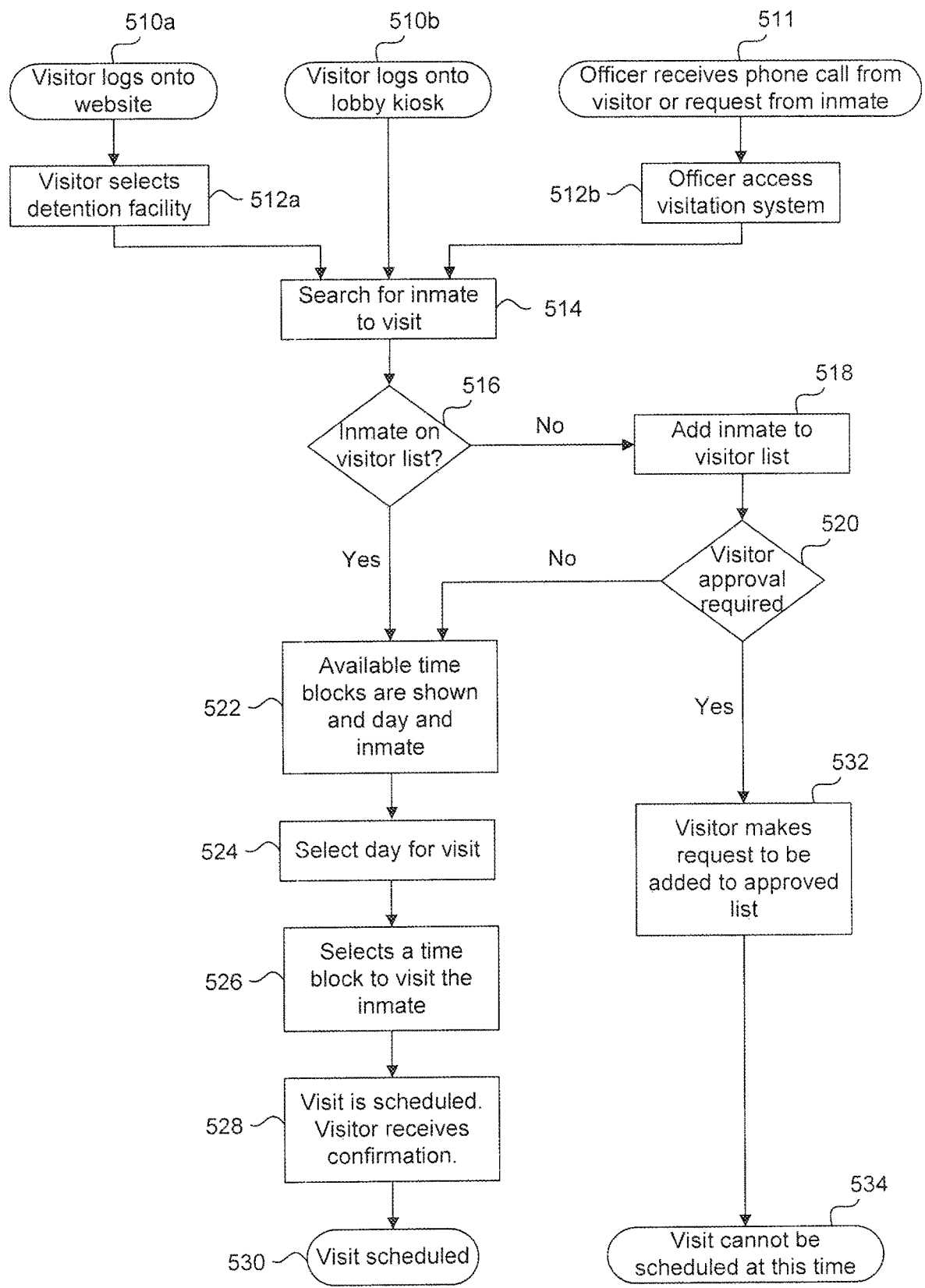
FIG. 5 illustrates a flowchart diagram of an exemplary method for scheduling a visitation session using the visitation control system.

With the above in mind, the operation of the system will first be described with respect to FIG. 5, which illustrates a flowchart diagram of a method 500 for scheduling a visitation. Although the physical devices and components that form the system have largely already been described, additional details regarding their more nuanced operation will be described below with respect to FIGS. 5-7.

A website (or other scheduling interface) may be managed by, or on behalf of the controlled facility, either individually or as part of a larger network of controlled facilities. This website provides an interactive platform for users of the visitation system to schedule and carry out visits with residents of the controlled facility. Thus, the website's backend links to or communicates with the application server 218 via the web server 216.

Scheduling a Visit

A user wishing to schedule a visitation must first be signed up with the website. This signup process is largely typical, requiring the user to submit identifying information and select a user name and password. However, unlike typical registrations, in an embodiment, the system may additionally assign the user a globally-unique (within the visitation system) PIN code for which the user can independently identify themselves to the system. Additionally, the system may require certain non-conventional information (such as biometrics) in order to verify the user's identity to a high degree of likelihood. As discussed above, this is particularly important for security purposes, to ensure that the system can properly vet the inmate's contacts. As will all authentication procedures described herein, upon a predetermined number of failed attempts to authenticate themselves, the user will be permanently prohibited access (at least until the individual can confirm their identity with another authorized individual and have their account unlocked).

Once registered, the user logs on to the website (510*a*) and selects the detention facility in which the desired inmate is being held (512*a*). If the user is already at the facility, then the visitor may log into a local kiosk (510*b*). Additionally, in an embodiment, the system permits authorized personnel (e.g., Correctional Officers) to schedule visits on a user's behalf. As such, a user may contact an Officer (511), who then accesses the scheduling system (512*b*).

Once the user (or Office in the latter case) has gained access to the scheduling system of the particular facility associated with the desired inmate, the user then searches for the inmate (514) and identifies the desired inmate to the system. The application server 218 receives the selection from the web server 216, and accesses the inmate data 410 associated with the desired inmate as well as the visitor data associated with the visitor. From this data, the application server 218 determines whether the inmate is listed on the visitor's inmate list (516) (e.g., a list of inmates with which the visitor has been approved to communicate).

If the inmate is not on the visitor list (516-N), then the visitor may request that the inmate be added to his/her list (518). In some instances, approval may not be required, such as in the case of approved social workers, direct family members, etc. However, in many cases, approval is required (520-Y). When such approval is required, the visitor makes a request for the inmate to be added to his/her approved list (532), and the visit scheduling temporarily terminates (534) until a later date at which the visitor has been approved.

If the inmate is on the visitor list (516-Y) or if no approval is required to add the inmate (520-N), then the application server 218 accesses scheduling data 440 and populates a calendar of availability (522) to provide to the visitor. This calendar may be in the form of a graphical depiction (such as an actual calendar), or may simply list available days/times for the particular inmate. The calendar is populated by examining both the availability schedule of the inmate based on the inmate data 410 (including the inmate's daily schedule) as well as the general availability of visitation devices from the scheduling data 440.

Using the availability calendar, the visitor selects a day/time for the visit (524/526). In an embodiment, the availability calendar first provides broad availability, such as available days, for selection. Once the desired day is selected (524), then a more narrow availability (such as time blocks within the selected day) is provided. The user can then select the desired time from the available time blocks (526).

Once the selection has been made, the application server 218 updates the scheduling data 440 to include the newly-scheduled visit and sends a confirmation notice to the visitor (528). In an embodiment where the visit will occur using a community device within the prison, the application server 218 also updates the availability of that particular device in the system so that it is blocked off for the scheduled time period and can not be reassigned to another visitor. Once the scheduling data has been updated, the visit has been scheduled (530).

Carrying Out an In-Person Visit

Figure 6:
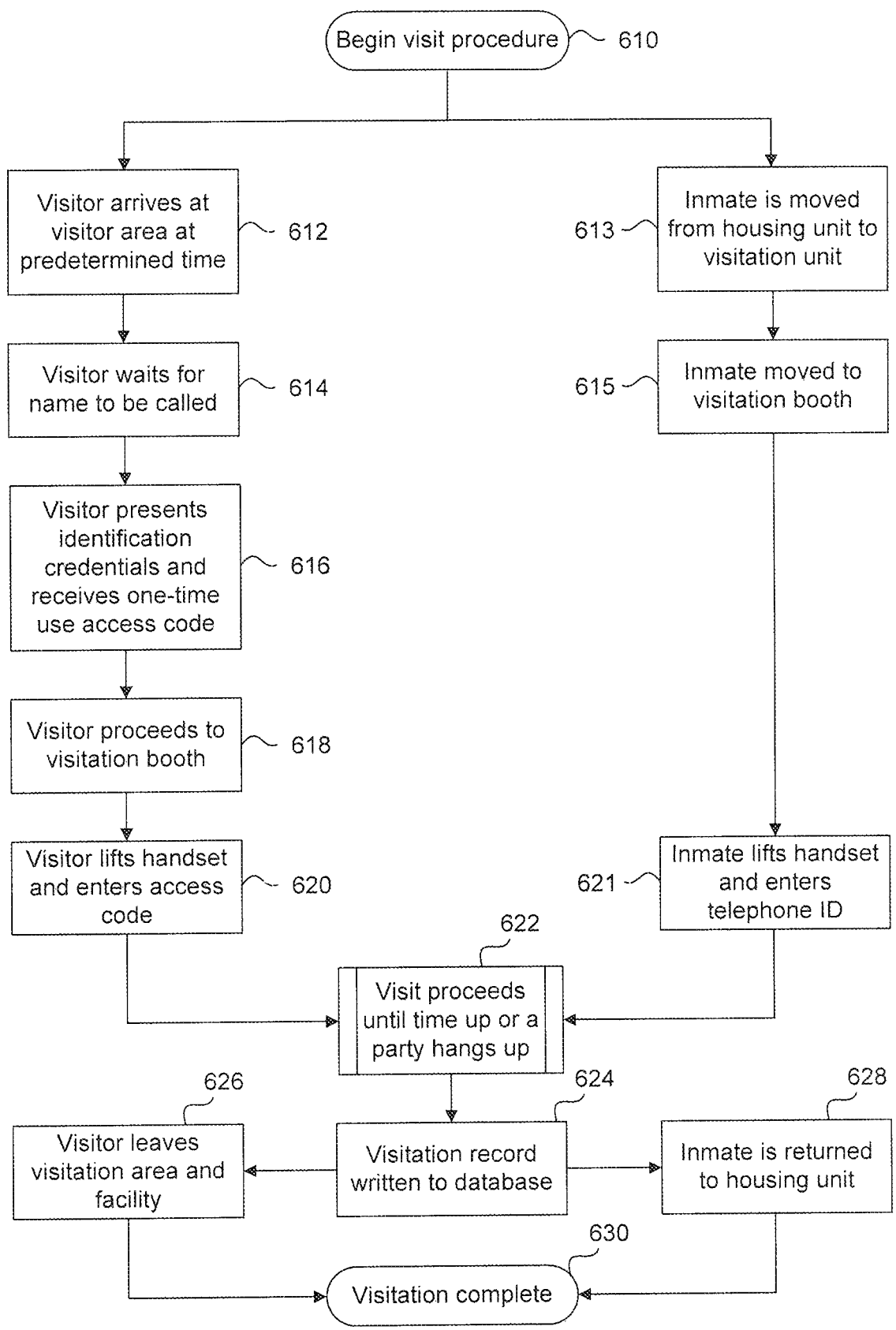
FIG. 6 illustrates a flowchart diagram of an exemplary visitation method.

FIG. 6 illustrates a flowchart diagram of an exemplary method 600 for carrying out an in-person visit. At the outset, the visit procedure begins (610). This may consist of the application server monitoring the scheduling data 440 and determining that a visit is set to begin a predetermined amount of time later. The application server 200 may then issue notifications to one or more of the visit participants, such as via an automated call, SMS text message, and/or email. At a time nearer to the scheduled appointment, the application server 200, still monitoring the scheduling data 440, may notify a visitation guard of the approaching visitation appointment.

At a time near the appointment, the visitor arrives at a visitation area (612). The visitor waits in a staging area until his/her name is called, either by the system or an on-duty Corrections Officer (614). The visitor presents identification information, either to the system, or the Officer in order to verify his/her identity (616). In the former scenario, the visitor may present their information, including photo identification and previously-assigned PIN number to the visitation control station 108, which relays the information to the application server 200 for authentication.

In an embodiment, the visitation control station 108 may also acquire instantaneous authentication information, such as biometric information. For example, the visitation control station 108 may include one or more biometric scanners, such as a fingerprint reader for capturing fingerprint data, camera for capturing facial information, stereoscopic camera for capturing 3-dimensional image data, infrared camera for capturing heat signature data, signature pad for capturing a signature of the individual, microphone for capturing voice information, among others. The system can be configured for any of these types of authentication information. For example, authentication can be performed based on facial architecture in the case of 3D images, or based on signature analysis, etc. Alternatively, or additionally, the visitation control station may include any number of other identification implementations, such as an RFID reader for identifying a radio frequency tag previously issued to the visitor, etc. In order to perform the authentication, the system compares the captured biometric information to stored information and determines whether they match to a predetermined degree.

Once authenticated, in an embodiment, the system issues a one-time use access code to the user. Such a one-time use access code adds another level of security to the system by allowing only the authorized and authenticated user to use the visitation device at the designated time. In an embodiment, as an alternative to issuing a one-time access code, the system can instead perform a multi-level authentication process, requiring the individual to submit their globally-unique ID and at least one form of biometric data for authentication. In an embodiment, authentication is also performed on the inmate.

The visitor then proceeds to the visitation booth (618). At the visitation booth, the visitor lifts the handset and enters the one-time access code (620).

While the visitor is being authenticated, etc., the inmate is also taking steps to begin the visitation. For example, the inmate is first moved from the housing unit to the visitation area (613). In an embodiment, this occurs after the application server notifies the Corrections Officer of the impending appointment. At the scheduled time, the inmate is moved to the visitation booth (615). When ready, the inmate lifts the handset and enters his own personal telephone ID (621). In an embodiment, the telephone ID is the ID number or PIN assigned to the inmate for him to identify himself to the phone system for purposes of making general telephone calls, as well as for requesting other services.

Once both the visitor and the inmate have picked up their respective phones or have in some other way begun the visit, the visit proceeds (622). As previously discussed, the communications exchanged between the parties are also provided to the audio server 214, which performs real-time monitoring of the conversation (if permitted), or forwards the conversation data to a monitoring station, such as monitoring station 180 for review by an officer or other trained individual.

In an embodiment, live monitors can perform live monitoring of any visit at the monitoring station 180 or at a remote terminal. The remote terminal can be a personal device, such as a smartphone or tablet, or can be a home computer. In the same manner that the visitation system is capable of sending audio/video data to the live monitor, the live monitor can also instruct the visitation system to notify another individual, and to forward the visitation data to the other individual for additional monitoring.

During the visit, there are several different safeguards that can be monitored in an ongoing fashion. For example, images and/or audio data can continue to be captured for authentication purposes. Such ongoing authentication can be performed in either a continuous or a periodic fashion. Additionally, computer or live monitored can also be performed in order to detect whether either party to the visit violates a particular rule, such as the exchange of contraband, or engaging in forbidden topics of conversation. As a result of detecting a rules violation by the visitation system, the visitation system can be configured to take any number of different actions. For example, the visitation system can interrupt the visit and issue a pre-recorded warning, issue a notification to a live monitor, or terminate the call. Similarly, if a live monitor is involved, the live monitor has the ability to barge into the call to state a warning, terminate the call, etc.

The visit proceeds until either party terminates the visit by hanging up the receiver, until the time expires, or until the monitoring system or monitoring individual detects a rules violation and terminates the call in response. In this regard, the application server monitors the time and the pre-designated duration of the visit, and can cut the lines' access upon expiration of the visit.

Once the visit has terminated, the application server detects the termination and writes a visitation record into the visitation history data store 430. In an embodiment, the audio server 214 also temporarily stores the communication until the visit ends. Once the visit has terminated, the application server notifies the audio server, at which time the audio server sends the recorded audio to the NAS storage device 460 for long-term archival.

Following the termination of the visit, the visitor is directed out of the facility (626) and the inmate is returned to the housing unit (628). Once separated, the visit completes (630).

Carrying Out a Remote Visit

Figure 7:
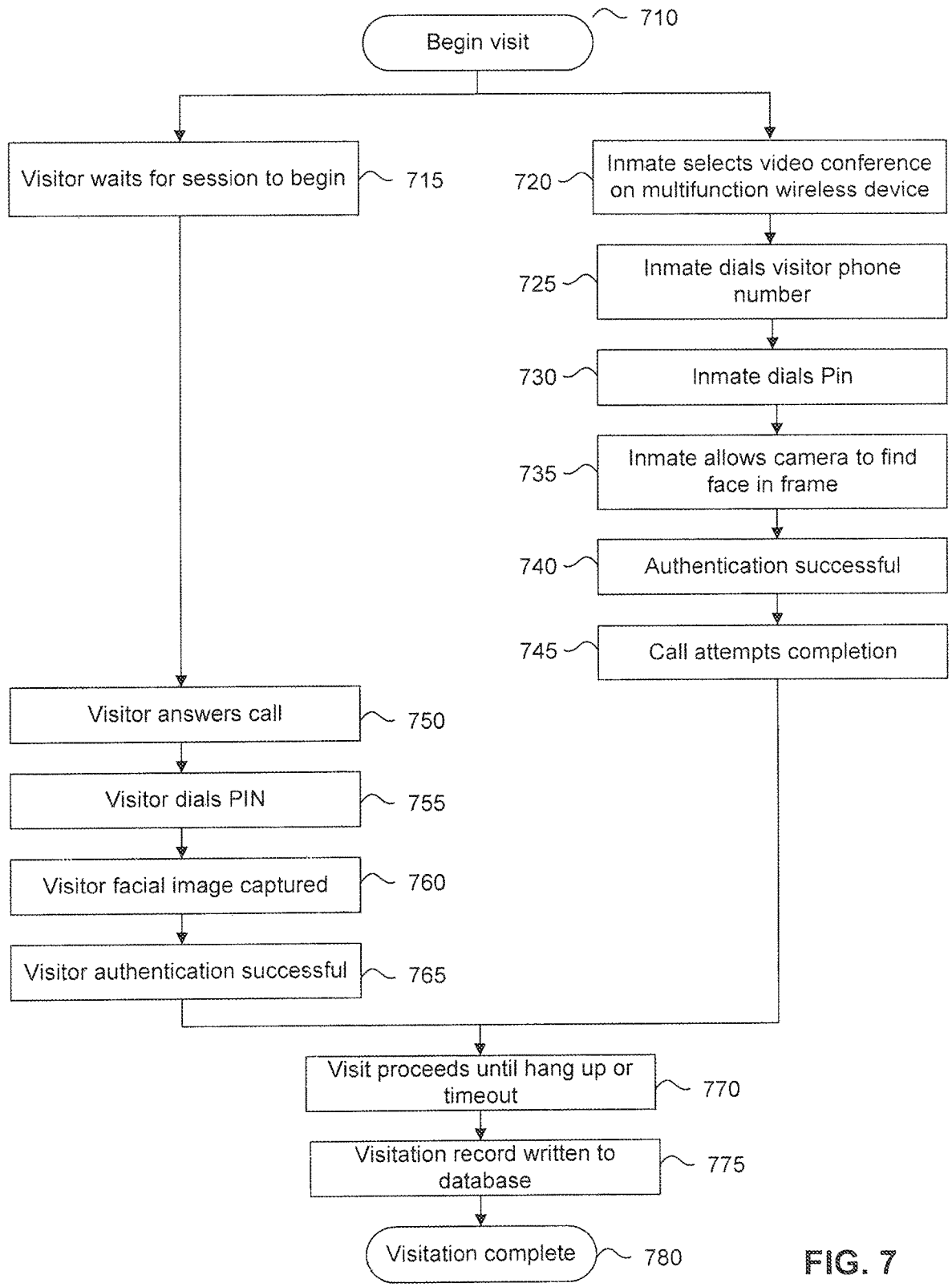
FIG. 7 illustrates a flowchart diagram of a second exemplary visitation method.

FIG. 7 illustrates a flowchart diagram of an exemplary method 700 for carrying out a remote visit. At the outset, the visit procedure begins (710). This may consist of the application server monitoring the scheduling data 440 and determining that a visit is set to begin a predetermined amount of time later. The application server 200 may then issue notifications to one or more of the visit participants, such as via an automated call, SMS text message, and/or email.

In this exemplary embodiment, the visit is initiated by the inmate. However, it should be understood that the following description is applicable in reverse for a visitor-initiated visit. In this example, the inmate selects the desired conference type on his/her assigned multifunction wireless device, such as for example a video call (720). Once selected, the inmate enters his PIN (730).

Authentication is then carried out on the prisoner (735). This can include performing biometric verification using the device's microphone for voice authentication, camera for facial authentication, or an on-board fingerprint scanner for fingerprint identification, as well as any of the other biometric authentications that have been described herein. In addition, and unique to remote visits, location verification can also optionally occur. Specifically, the visitation system can receive GPS data from smart devices, RF geofencing information, or 3D image verification, among other location data to allow the system to verify that the caller is within a predetermined area. The authentication information is sent by the inmate's device to the application server, which carries out authentication using the inmate data 410. Once authenticated (740), the inmate dials the outgoing number of the visitor to attempt the visit (745). This causes the application server to dial out to the visitor.

Upon receiving the call from the application server, the visitor answers (750). The application server 200 then prompts the user to enter his/her PIN (755) and provide biometric information in the same manner as described above (760). Using the acquired biometric information, the application server 200 performs authentication of the visitor. Once the visitor has been successfully authenticated (765), the visit proceeds (770) until either party hangs up, funds are depleted or until time expires. The termination of the visit may occur in the same manner as described above.

As with the in-person visit, there are several different safeguards that may occur during the visit that can be monitored in an ongoing fashion. For example, images and/or audio data can continue to be captured for authentication purposes. Such ongoing authentication can be performed in either a continuous or a periodic fashion. Additionally, computer or live monitored can also be performed in order to detect whether either party to the visit violates a particular rule, such as the exchange of contraband, or engaging in forbidden topics of conversation. As a result of detecting a rules violation by the visitation system, the visitation system can be configured to take any number of different actions. For example, the visitation system can interrupt the visit and issue a pre-recorded warning, issue a notification to a live monitor, or terminate the call. Similarly, if a live monitor is involved, the live monitor has the ability to barge into the call to state a warning, terminate the call, etc.

During the visit, the communication information is provided to the audio server 214, and the video server 212 in the case of a video visit. The servers capture the respective data for real-time monitoring purposes (if permitted). Additionally, once the visit has terminated, the application server updates the visitation history data 430 with a record of the visit (775), and the servers transmit their recordings to the NAS storage device for long-term archival. Once the data has been transmitted and the records have been updated, the visit is considered to be complete (780).

Exemplary Computer Implementation

It will be apparent to persons skilled in the relevant art(s) that various elements and features of the present disclosure, as described herein, can be implemented in hardware using analog and/or digital circuits, in software, through the execution of computer instructions by one or more general purpose or special-purpose processors, or as a combination of hardware and software.

Figure 8:
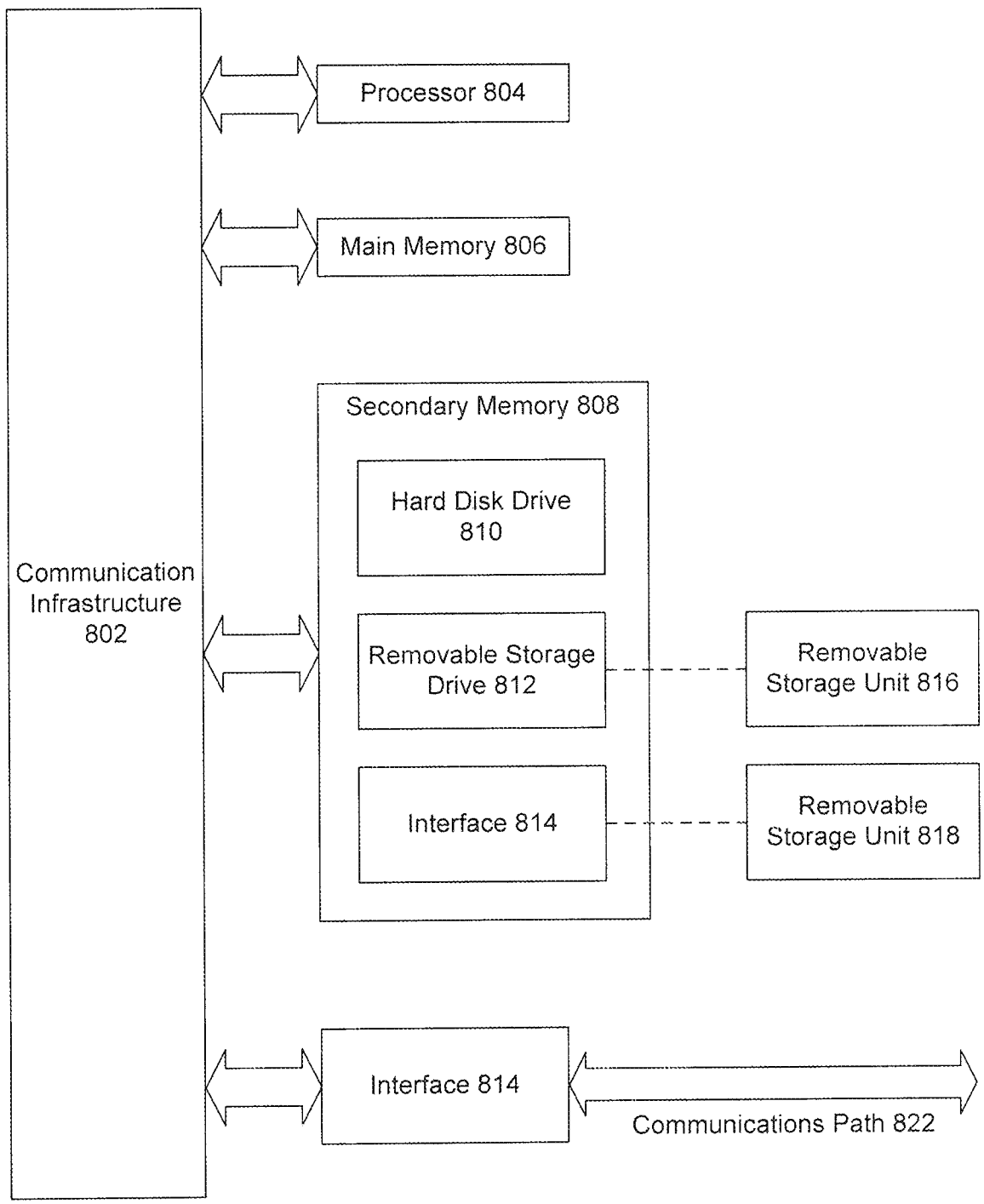
FIG. 8 illustrates a block diagram of a general purpose computer that may be used to perform various aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. For example, the methods of FIGS. 5-7 can be implemented in the environment of one or more computer systems or other processing systems. An example of such a computer system 800 is shown in FIG. 8. One or more of the modules depicted in the previous figures can be at least partially implemented on one or more distinct computer systems 800.

Computer system 800 includes one or more processors, such as processor 804. Processor 804 can be a special purpose or a general purpose digital signal processor. Processor 804 is connected to a communication infrastructure 802 (for example, a bus or network). Various software implementations are described in terms of this exemplary computer system. After reading this description, it will become apparent to a person skilled in the relevant art(s) how to implement the disclosure using other computer systems and/or computer architectures.

Computer system 800 also includes a main memory 806, preferably random access memory (RAM), and may also include a secondary memory 808. Secondary memory 808 may include, for example, a hard disk drive 810 and/or a removable storage drive 812, representing a floppy disk drive, a magnetic tape drive, an optical disk drive, or the like. Removable storage drive 812 reads from and/or writes to a removable storage unit 816 in a well-known manner. Removable storage unit 816 represents a floppy disk, magnetic tape, optical disk, or the like, which is read by and written to by removable storage drive 812. As will be appreciated by persons skilled in the relevant art(s), removable storage unit 816 includes a computer usable storage medium having stored therein computer software and/or data.

In alternative implementations, secondary memory 808 may include other similar means for allowing computer programs or other instructions to be loaded into computer system 800. Such means may include, for example, a removable storage unit 818 and an interface 814. Examples of such means may include a program cartridge and cartridge interface (such as that found in video game devices), a removable memory chip (such as an EPROM, or PROM) and associated socket, a thumb drive and USB port, and other removable storage units 818 and interfaces 814 which allow software and data to be transferred from removable storage unit 818 to computer system 800.

Computer system 800 may also include a communications interface 820. Communications interface 820 allows software and data to be transferred between computer system 800 and external devices. Examples of communications interface 820 may include a modem, a network interface (such as an Ethernet card), a communications port, a PCM-CIA slot and card, etc. Software and data transferred via communications interface 820 are in the form of signals which may be electronic, electromagnetic, optical, or other signals capable of being received by communications interface 820. These signals are provided to communications interface 820 via a communications path 822. Communications path 822 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 816 and 818 or a hard disk installed in hard disk drive 810. These computer program products are means for providing software to computer system 800.

Computer programs (also called computer control logic) are stored in main memory 806 and/or secondary memory 808. Computer programs may also be received via communications interface 820. Such computer programs, when executed, enable the computer system 800 to implement the present disclosure as discussed herein. In particular, the computer programs, when executed, enable processor 804 to implement the processes of the present disclosure, such as any of the methods described herein. Accordingly, such computer programs represent controllers of the computer system 800. Where the disclosure is implemented using software, the software may be stored in a computer program product and loaded into computer system 800 using removable storage drive 812, interface 814, or communications interface 820.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

Conclusion

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the invention should not be limited by any of the above-described exemplary embodiments, but should be defined only in accordance with the following claims and their equivalents.

What is claimed is:

1. A visitation management system for scheduling a visitation between an inmate of a controlled environment facility and an outside party, comprising:
   a scheduling interface configured to interface between the outside party and the visitation management system, and to receive a request for scheduling the visitation; and
   one or more processors configured to:
      receive the request from the scheduling interface;
      verify that the outside party is not on a visitor list associated with the inmate;
      determine that the outside party is a member of a class of individuals that do not require approval to be on the visitor list;
      automatically approve the outside party in response to the determining;
      generate a calendar of available visit slots for the visitation based on the request and a stored inmate availability; and
      receive a visit selection of one of the visit slots from the outside party.

2. The visitation management system of claim 1, wherein the received request includes identification information of the outside party.

3. The visitation management system of claim 2, wherein the one or more processors are further configured to authenticate the outside party based on the identification information.

4. The visitation management system of claim 3, wherein the identification information includes biometric information.

5. The visitation management system of claim 3, wherein the one or more processors are further configured to determine whether the authenticated outside party is on the visit list.

6. The visitation management system of claim 1, wherein the one or more processors are further configured to update the stored inmate availability based on the received visit selection.

7. The visitation management system of claim 1, wherein the initial screening includes determining that the outside party is included on the visitor list.

8. The visitation management system of claim 1, wherein the one or more processors are further configured to transmit a confirmation communication to the outside party and the inmate so as to notify them of the scheduled visit.

9. The visitation management system of claim 1, wherein the one or more processors are further configured to:
   determine that the outside party is not on the visitor list; and
   initiate a registration protocol for adding the outside party to the visitor list.

10. A method for scheduling a visitation between an inmate of a controlled environment facility and an outside party, comprising:
    generating a scheduling interface for allowing the outside party to interface with a visitation management system;
    receiving a request from the outside party via the scheduling interface for a visit with the inmate;
    verifying that the outside party is not on a visitor list associated with the inmate;
       determining that the outside party is a member of a class of individuals that do not require approval to be on the visitor list;
    automatically approving the outside party in response to the determining;
    generating a calendar of available visit slots for the visitation based on the request and a stored inmate availability; and
    receiving a visit selection of one of the visit slots from the outside party.

11. The method of claim 10, wherein the received request includes identification information of the outside party.

12. The method of claim 11, further comprising authenticating the outside party based on the identification information.

13. The method of claim 12, wherein the identification information includes biometric information.

14. The method of claim 12, further comprising determining whether the authenticated outside party is on the visitor list.

15. The method of claim 10, further comprising updating the stored inmate availability based on the received visit selection.

16. The method of claim 10, wherein the screening includes determining that the outside party is included on the visitor list.

17. The method of claim 10, further comprising transmitting a confirmation communication to the outside party and the inmate to notify them of the scheduled visit.

18. The method of claim 10, further comprising:
- determining that the outside party is not on the visitor list; and
- initiating a registration for adding the outside party to the visitor list.

\* \* \* \* \*